(12) United States Patent
Jensen

(10) Patent No.: US 7,818,139 B2
(45) Date of Patent: Oct. 19, 2010

(54) ROTOR/STATOR RELATIVE POSITION DETERMINING METHOD AND APPARATUS

(75) Inventor: Raymond Verle Jensen, Gardnerville, NV (US)

(73) Assignee: General Electric Company, Schenectady, NY (US)

(*) Notice: Subject to any disclaimer, the term of this patent is extended or adjusted under 35 U.S.C. 154(b) by 159 days.

(21) Appl. No.: 12/257,561

(22) Filed: Oct. 24, 2008

(65) Prior Publication Data

US 2010/0102846 A1    Apr. 29, 2010

(51) Int. Cl.
    *G06F 15/00* (2006.01)
(52) U.S. Cl. ...................................... 702/155
(58) Field of Classification Search ............ 702/57, 702/155; 318/600, 632; 324/662, 772
    See application file for complete search history.

(56) References Cited

U.S. PATENT DOCUMENTS

| 4,374,383 | A |   | 2/1983 | Polk et al. |
| 5,295,388 | A |   | 3/1994 | Fischer et al. |
| 5,382,899 | A | * | 1/1995 | Funatsu et al. ......... 324/207.18 |
| 5,513,539 | A |   | 5/1996 | McLaughlin et al. |
| 5,969,531 | A | * | 10/1999 | Murakami et al. ......... 324/545 |
| 5,990,807 | A |   | 11/1999 | Cloutier et al. |
| 6,075,464 | A |   | 6/2000 | Cloutier et al. |
| 6,692,222 | B2 |   | 2/2004 | Prinz et al. |
| 2004/0135588 | A1 | * | 7/2004 | Bissonnette et al. ......... 324/662 |

* cited by examiner

*Primary Examiner*—Bryan Bui
(74) *Attorney, Agent, or Firm*—Cantor Colburn LLP

(57) ABSTRACT

A data signal indicative of a gap between a sensor and at least one of a surface of a rotor and a surface of a stator rotating relative to the sensor is sent to a computer processor. The computer implements defining a plurality of lowest values of the data signal over a revolution of relative rotation between the rotor and the stator, and displaying the plurality of lowest values for assessment of the distance between the sensor and a surface of at least one of the rotor and the stator in order to determine a position of the rotor relative to the stator.

20 Claims, 5 Drawing Sheets

ROTOR/STATOR RELATIVE POSITION DETERMINING METHOD AND APPARATUS

BACKGROUND OF THE INVENTION

As part of commissioning a hydro turbine generator after major assembly and alignment, a verification test must be performed to show that the generator rotor is centered in the stator. Generator rotors can vary, for example, from less than 6 meters in diameter to over 15 meters in diameter with an air gap of about 1 centimeter up to about 2 centimeters. The air gap is typically maintained within 10% of nominal, which requires that the rotor be centered to within, for example, from about 1 millimeter to about 2 millimeters of the center of the stator for the typical range of air gap size. On generators with high pressure lift thrust bearings, an air gap sensor is temporarily attached to the rotor, such as at a rotor pole, and the rotor is spun by hand. Output of the sensor is recorded during rotation of the rotor and an indication of the completion of a revolution is provided, either on the same channel as the sensor output or on a second channel, to define the limits of each rotation.

The stator is perceived as a non-continuous surface with stator teeth and winding slots because the sensor is responsive to electrically conductive material, resulting in variation in the magnitude of the output signal of the sensor. Depending on the type of sensor, the points at which the rotor is closest to the electrically conductive material of the stator (the tips of the stator teeth) are either minima or maxima of the output signal. The true shape of the stator surface can be shown by plotting the data points that correspond to the ends of the stator teeth, which are typically the minima or lowest values of the of the raw output signal.

However, because of the manual rotation of the extremely heavy rotor, the speed of rotation varies, and the frequency of the minima of the output signal of the sensor also varies. As a result of the varying speed, a once per turn event provides no way to detect how far the rotor has rotated for each recorded signal value and therefore the location of each winding or tooth can not be detected using a simple timing or sample count method. To overcome this, the recorded output is reviewed and the minimum value of the output for each tooth of the stator is determined manually. The manual determination is cumbersome and time consuming and leaves room for error. Accordingly, there is a need in the art for an easy, convenient, automated way to determine how close to centered a rotor is relative to a stator that allows for variable rotational speed of the rotor relative to the stator.

BRIEF DESCRIPTION OF THE INVENTION

A method in an embodiment comprises sending a data signal to a computer processor, the data signal being indicative of a gap between a sensor and at least one of a surface of a rotor and a surface of a stator that is rotating relative to the sensor. The method also comprises executing a computer executable code with the processor to implement defining a plurality of lowest values of the data signal over a revolution of relative rotation between the rotor and the stator and displaying the plurality of lowest values for assessment of the distance between the sensor and a surface of at least one of the rotor and the stator in order to determine a position of the rotor relative to the stator.

An apparatus in an embodiment comprises a computer processor configured to receive a sensor data signal indicative of a gap between a sensor and at least one of a surface of a rotor and a surface of a stator that is rotating relative to the sensor. The processor executes a computer executable code to form means for defining a plurality of lowest values of the data signal over a revolution of relative rotation between the rotor and the stator and means for displaying the plurality of lowest values for assessment of the distance between the sensor and a surface of at least one of the rotor and the stator in order to determine a position of the rotor relative to the stator.

DETAILED DESCRIPTION OF THE INVENTION

Figure 1:
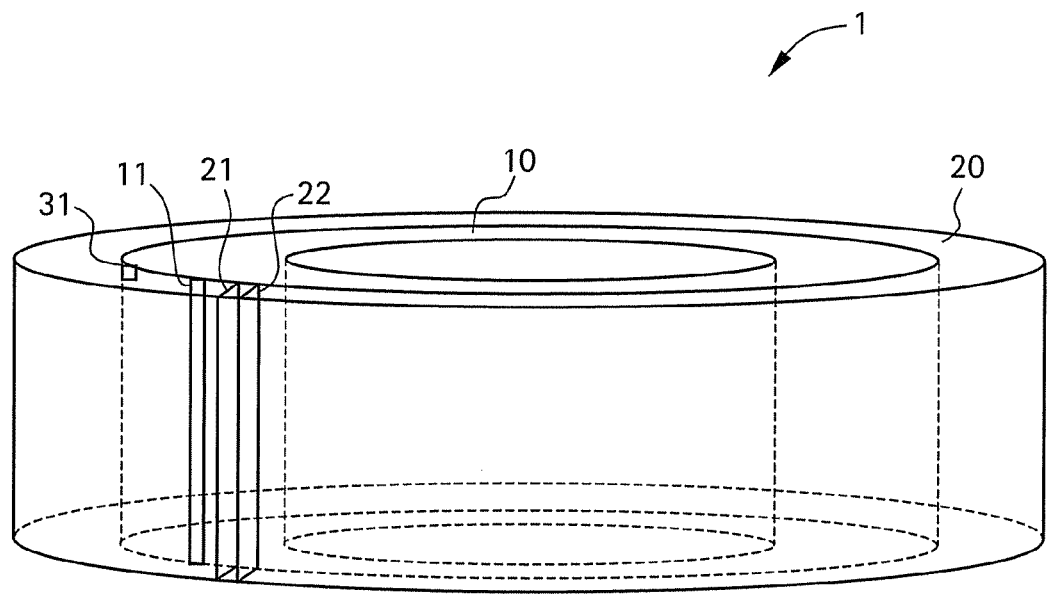
FIG. 1 is a schematic perspective view of a generator with which an embodiment is used.

With reference to the accompanying Figures, examples of a rotor/stator relative position determining method and apparatus according to embodiments of the invention are disclosed. For purposes of explanation, numerous specific details are shown in the drawings and set forth in the detailed description that follows in order to provide a thorough understanding of embodiments of the invention. It will be apparent, however, that embodiments of the invention may be practiced without these specific details. In other instances, well-known structures and devices are schematically shown in order to simplify the drawing.

With reference to FIG. 1, a generator 1, such as a hydrodynamic turbine driven generator, includes a rotor 10 carrying magnets or poles 11 mounted within a stator 20 carrying windings 21. Only one pole 11 and one winding 21 are shown, but it should be understood that there are a plurality of each of these evenly distributed around the rotor 10 and stator 20, respectively. In operation, the rotor 10 turns within the stator 20 so that relative motion is induced between the poles 11 and windings 21, generating electricity. The stator 20 includes stator teeth 22 that extend toward the rotor 10 and are the parts that come closest to the rotor 10. By knowing how many stator teeth 22 are on the stator 20, and that the stator teeth 22 are evenly distributed about the stator 20, the position of each tooth 22 is determined. In an embodiment, tooth position is expressed in units of rotation, such as degrees or radians, by dividing the number of units in one revolution, such as 360° or $2\pi$ radians, by the number of teeth 22. In another embodiment, tooth position is expressed in units of distance by dividing the circumference of the stator inner surface by the number of teeth 22. At assembly of the generator 1, it is desirable to have the rotor 10 centered to within from about 1 millimeter to about 2 millimeters of the center of the stator 20. To determine how close to centered the rotor 10 is, embodiments determine a gap between the periphery of the rotor 10 and the surface of the stator 20 by use of a strategically placed sensor 31. The determination of the gap allows determination of the position of the rotor 10 relative to the stator 20, which is indicative of and allows determination of how close to centered the rotor 10 is relative to the stator 20.

To determine the gap between the rotor 10 and the surface of the stator 20, especially the stator teeth 22, embodiments include a sensor 31 mountable on the rotor 10 and arranged to face the stator 20. The sensor 31 in embodiments is an air gap sensor, such as a capacitive sensor, and is configured to generate an output signal or data signal 32, such as a voltage, indicative of and that varies with the gap or distance between the sensor 31 and the stator 20. When the sensor 31 is properly mounted, the gap between the sensor 31 and the surface of the stator 20 is substantially identical to the gap between the outer periphery of the rotor 10 and the inner surface of the stator 20. The variation in the profile of the stator 20 due to the teeth 22 and winding slots therebetween results in variation in the magnitude of the data signal 32 of the sensor 31. In an embodiment, the sensor 31 is responsive to proximity of metal, such as metal of the stator 20, and the points at which the rotor 10 is closest to the surface of the stator 20 (the tips of the stator teeth 22) are minima or lowest values of the data signal 32. Other embodiments can employ sensors for which the closest points are represented by maxima or highest values of the data signal. Thus, the data signal value has extrema corresponding to smallest distances to the surface or smallest gap between the rotor and stator surfaces and opposite extrema corresponding to points of largest distances to the surface or gap between the rotor and stator surfaces, minima being referred to as "lowest values" and maxima being referred to as "highest values." The shape of the surface of the stator 20 can be shown by plotting the data points that correspond to the stator teeth 22, such as the lowest values of the data signal 32, versus a suitable variable, such as angular position. This is done in embodiments by remapping the recorded values of the data signal 32 such that the minima or lowest values are placed at the locations of the stator teeth 22. While embodiments are disclosed herein having the sensor 31 disposed on the rotor 10, it is contemplated that an alternative embodiment can employ a similar sensor on the stator 20 measuring the distance to the outer surface of the rotor 10 for the purposes disclosed herein. Such a contemplated arrangement is considered as being included within the scope of the disclosed invention. Additionally, while a single sensor 31 is disclosed in the example embodiment, it is contemplated that an alternative embodiment can use multiple sensors on the rotor and/or the stator.

Figure 2:
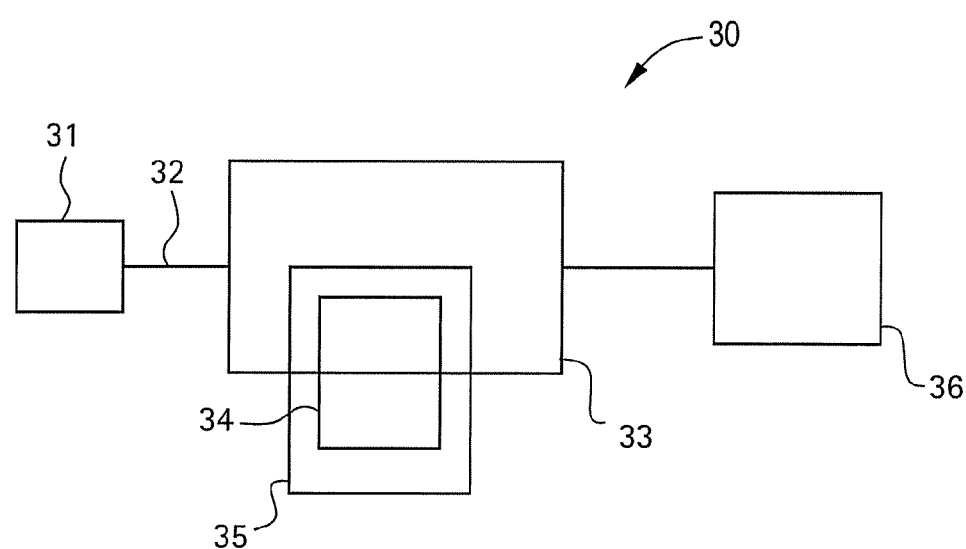
FIG. 2 is a schematic diagram of an apparatus according to an embodiment.
Figure 3:
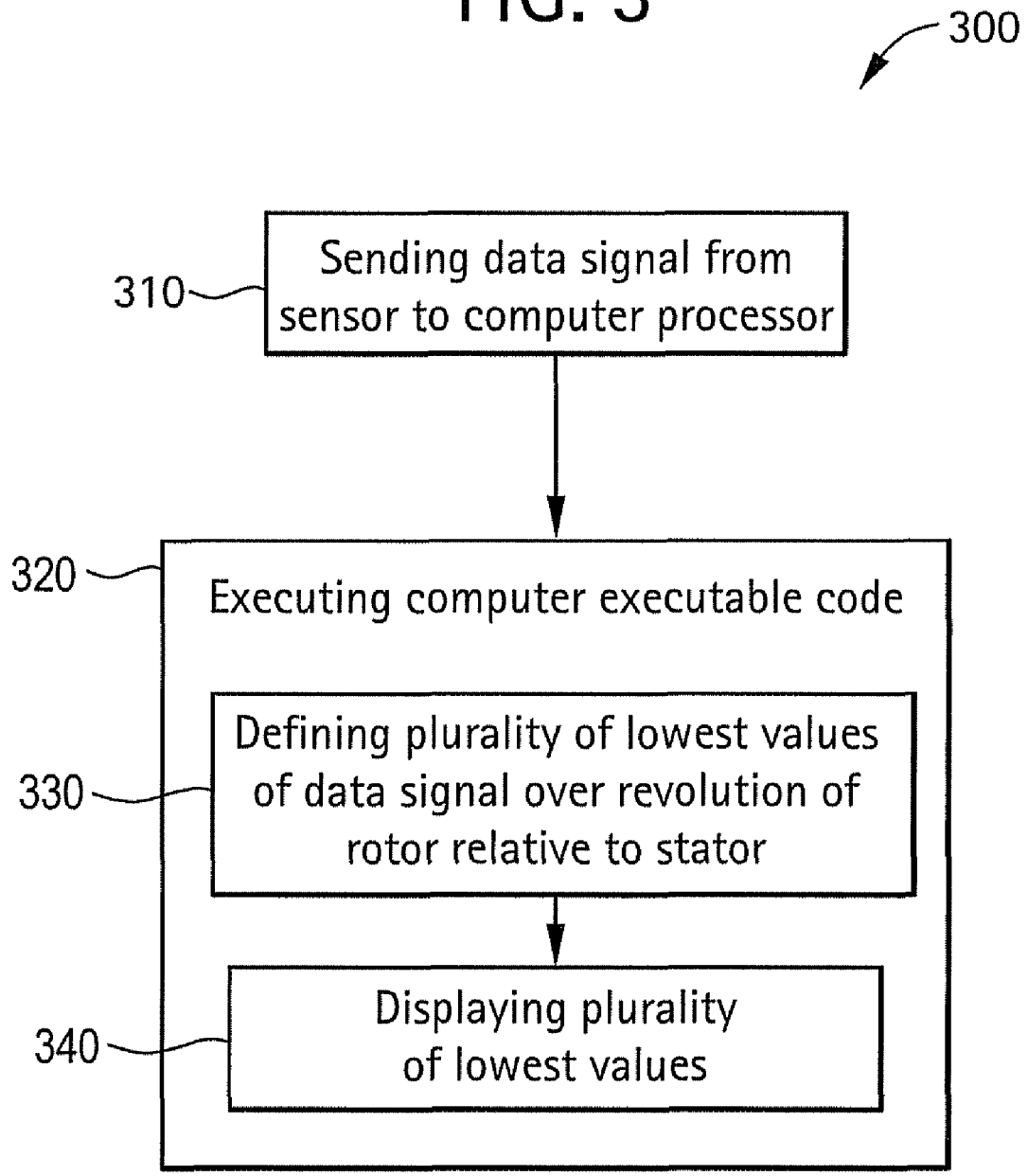
FIG. 3 is a schematic flow diagram of a method according to an embodiment.

As seen schematically in FIGS. 2 and 3, the output or data signal 32 of the sensor 31 in an embodiment is sent to a computer processor 33 that executes a computer software application or program product 34 stored as computer executable code in a data storage device 35 that includes a computer readable medium as will be described below. A method 300 according to embodiments thus includes sending a sensor data signal 32 to the computer processor (block 310), either directly via a signal path or indirectly via a computer readable storage medium, the sensor data signal 32 being indicative of and varying with a gap or distance between the sensor 31 and the surface of at least one of the rotor 10 and the stator 20 as relative rotation occurs between the rotor 10 and the stator 20. In an embodiment, the data signal 32 is indicative of a gap or distance between the rotor 10 and the stator 20, and the relative rotation occurs by rotation of the rotor 10, such as by manual rotation of the rotor 10 during commissioning of a generator. The computer software application or program product 34 implements a method (block 320) including finding a lowest value of the data signal 32 for each stator tooth 22 by, for example, defining a plurality of lowest values of the data signal 32 over at least one revolution of relative rotation between the rotor 10 to the stator 20 (block 330). The method also includes displaying the plurality of lowest values for assessment of the distance between the sensor 31 and the surface of at least one of the rotor 10 and the stator 20 (block 340) in order to determine the position of the rotor 10 relative to the stator 20, which is indicative of how centered the rotor 10 is. In an embodiment, displaying is done by remapping the plurality of lowest values to the known positions of the stator teeth 22 at which respective lowest values must occur. The positions of the teeth 22 are known as described above. Additionally, in an embodiment, the assessment is of the gap or distance between the surface of the rotor 10 and the surface of the stator 20 as particularly indicated by stator teeth 22. For example, in an embodiment, a display 36, such as a flat panel or CRT, is connected to the computer 33 and a plot of the plurality of lowest values of the data signal 32 versus angular position of the values is displayed. The data storage device 35 can also record the data signal 32 of the sensor 31, such as for later processing.

Figure 4:
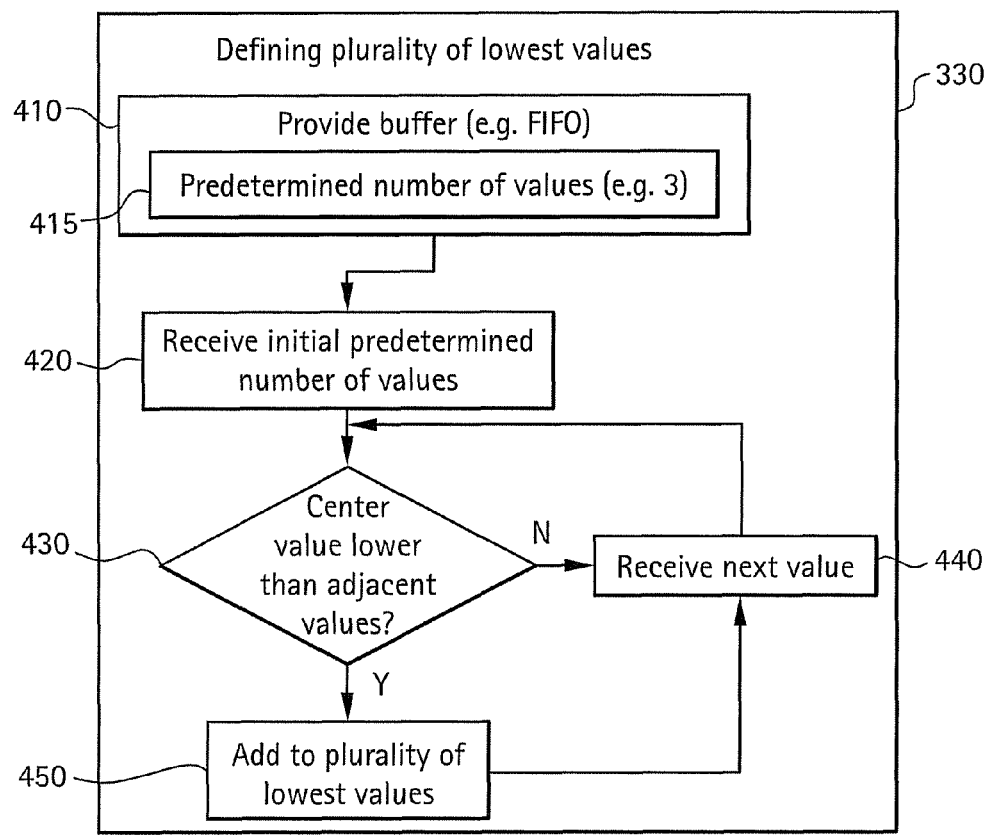
FIG. 4 is a schematic flow diagram of finding lowest values of sensor output signal according to an embodiment.
Figure 5:
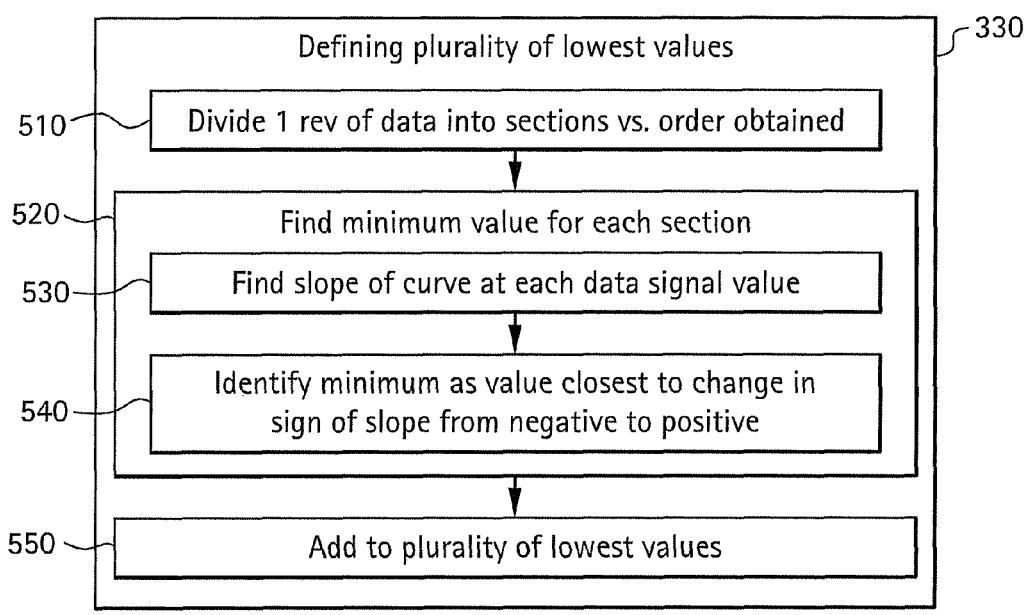
FIG. 5 is a schematic flow diagram of finding lowest values of sensor data signal according to an embodiment.
Figure 6:
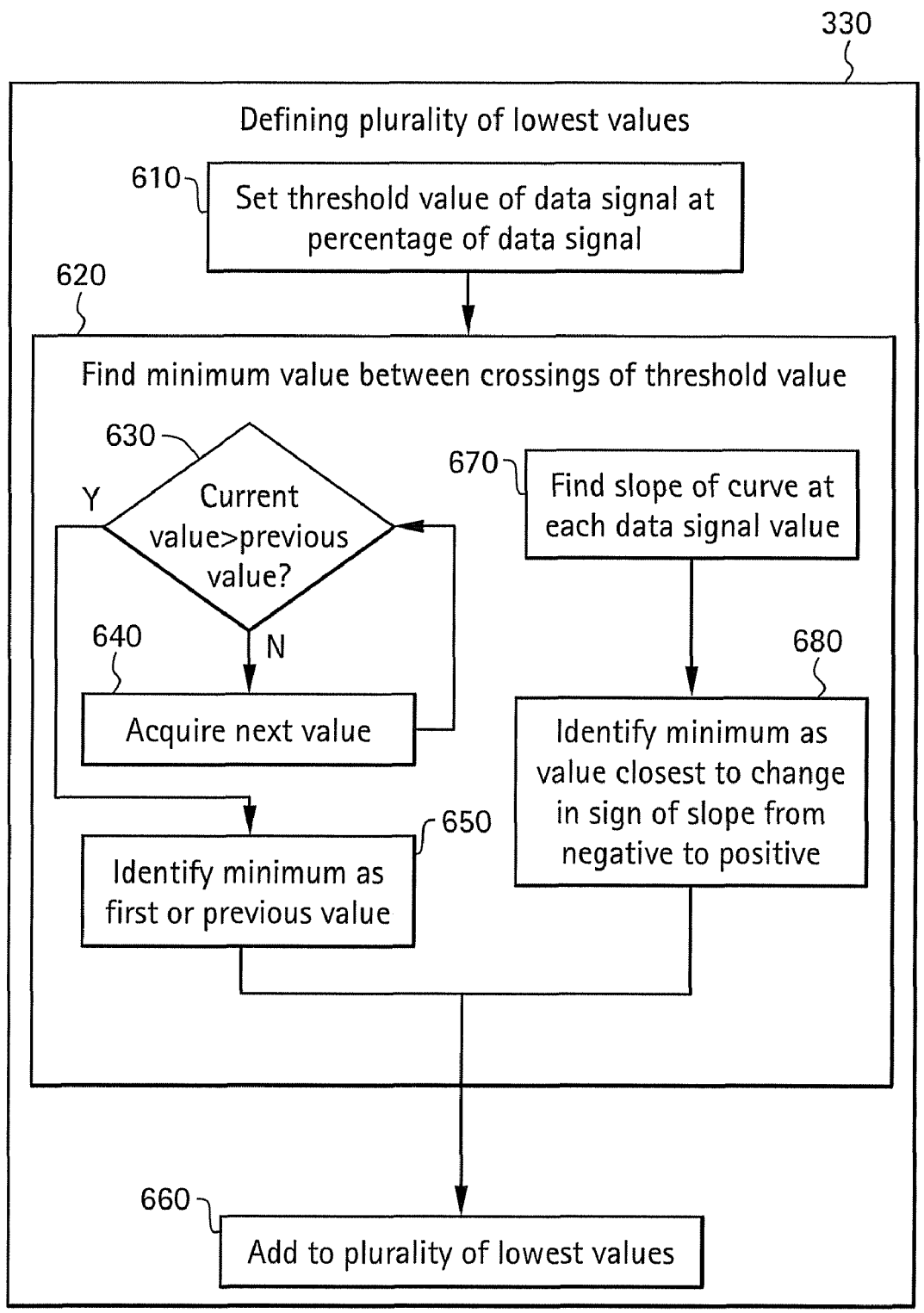
FIG. 6 is a schematic flow diagram of finding lowest values of sensor data signal according to an embodiment.

With reference to FIG. 4, the computer software application or program product 34 in embodiments defines a plurality of lowest values of the data signal 32 (block 330) by providing a buffer (block 410) that stores a predetermined number of most recent values (block 415) of the data signal 32 of the sensor 31. Initially, the buffer receives an initial number of values (block 420) and the method includes comparing a center value to adjacent values in the buffer to determine whether the center value is lower than the adjacent values (block 430). If the center value is not lower, then the buffer receives the next value (block 440) and repeats the comparison with the new center value (block 430). If the center value is lower, then it is determined that the center value is a lowest value of the data signal 32 and it is added to the plurality of lowest values (block 450), for example as an array stored in a memory, such as data storage device 35. The next value is then received (block 440) and the comparison is repeated (block 430). The comparison and reception of next values is repeated until there are no more values to be received or until an interruption occurs. Selecting a predetermined number of values (block 415) is done so that the predetermined number is large enough to reduce sensitivity to noise but is small enough to encompass only one of a plurality of evenly distributed stator teeth 22, or at least no more than one complete tooth. The predetermined number is preferred to be at least three to provide a center value and at least one value on either side of the center value. An appropriate buffer in embodiments is a FIFO (First In First Out) buffer that can store at least three values, though other buffers can be used in embodiments. Employing a buffer in this fashion finds the lowest value between each crossing by the data signal 32 of the zero value.

Alternatively, an embodiment defines a plurality of lowest values of the data signal 32 (block 330) by dividing the data signal 32 for a single revolution of data into sections or groups of consecutive data signal values in the order in which the values were obtained (block 510). Each section or group should include at least two consecutive data signal values at respective angular positions. Defining a plurality of lowest values of the data signal 32 also includes finding a minimum recorded or lowest value of the data signal 32 for each section or group (block 520), such as by finding the slope of the curve of data signal value versus angular position (block 530) and identifying the value of the data signal closest to a change in the sign of the slope for a given section or group from negative to positive as the minimum recorded or lowest value of the data signal 32 for the section or group (block 540). A point at which the sign of the slope changes is also called a transition point. However the minimum value is found for each section or group, it is added to the plurality of lowest values (block 550).

An embodiment also defines a plurality of lowest values of the data signal (block 330) by setting a threshold value at a predetermined percentage of the data signal (block 610) and determining a minimum value of the data signal between each crossing of the threshold by the value of the data signal (block 620). The predetermined percentage is a user-selected voltage level of the data signal in an embodiment. Finding the minimum in an embodiment is done by comparing values between crossings to determine a lowest of the values between each crossing. For example, this is done in an embodiment using a loop by comparing a current value to a previous value to see if the current value is larger than the previous value (block 630). When starting the loop, the first value can be used as the current value and the previous value, or the first two values can be compared with the first value being used as the "previous" value and the second value being used as the "current" value. If the current value is not greater than the previous value, then the next value is acquired and the comparison is repeated. If the current value is greater than the previous value, then the previous value is identified as the minimum value (block 650) and the minimum value is added to the plurality of lowest values (block 660). In addition, in embodiments, a buffer is used in a fashion similar to the method described in blocks 410-430 above.

In another embodiment, determining a minimum value is done by finding the slope of the curve of data signal value versus order obtained (block 670) and identifying the value of the data signal closest to a change in the sign of the slope for a given section from negative to positive as the minimum recorded value of the data signal 32 for the section (block 680), and adding the minimum value to the plurality of lowest values (block 660). The minimum value, whatever the manner in which it is found for each section, is added to the plurality of lowest values (block 660). This approach of using a threshold value requires frequent recalculation of the threshold value because the voltage swing for each stator tooth is typically on the same order as the total variation in the voltage for one revolution.

Figure 7:
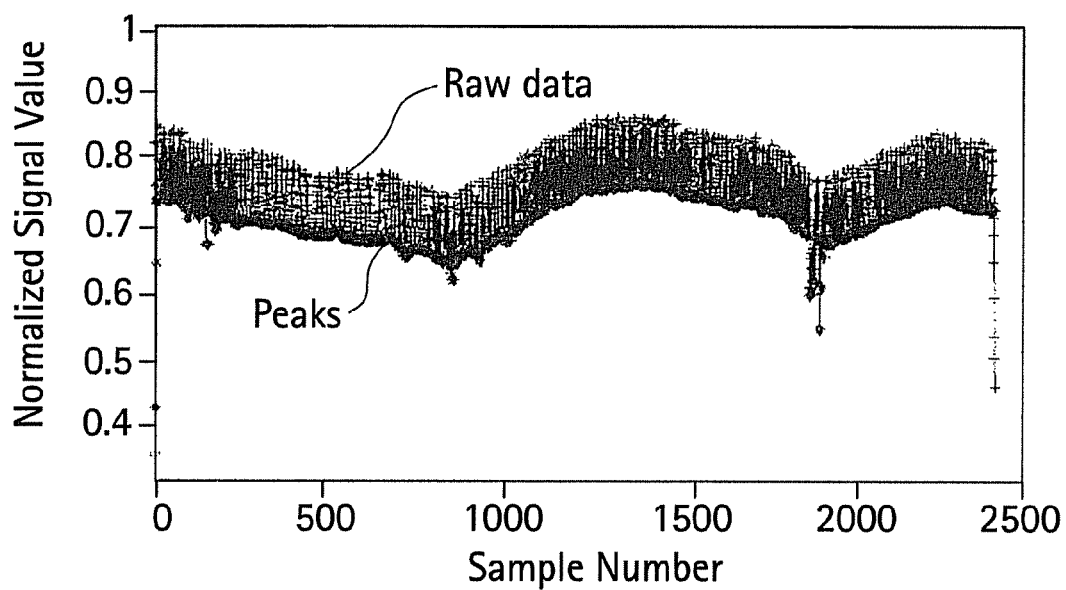
FIG. 7 is an example of output generated by the sensor and displayed according to embodiments.
Figure 8:
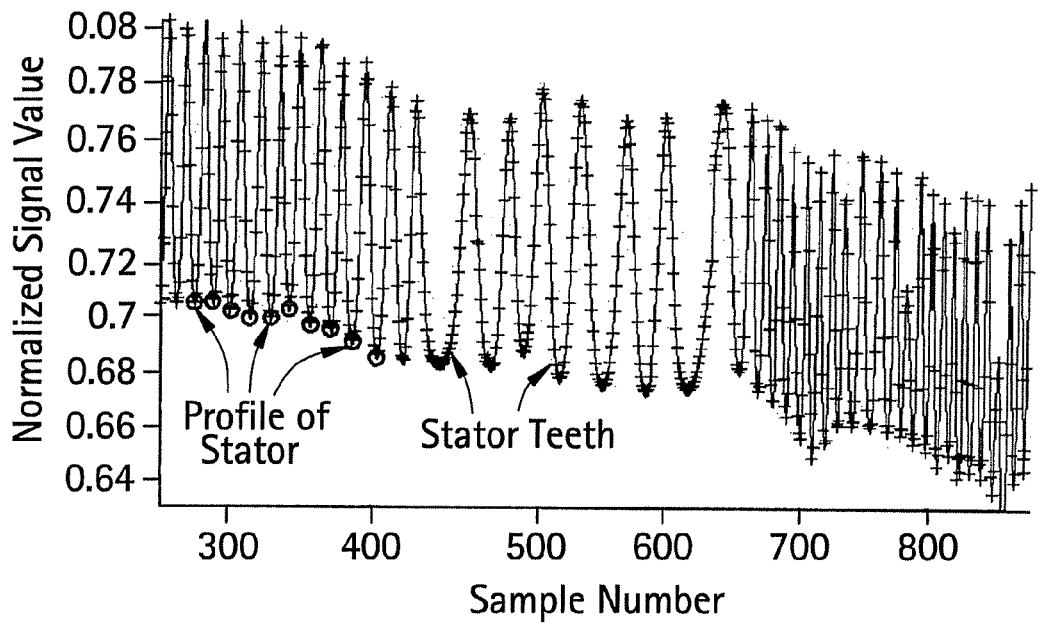
FIG. 8 is a close up of the example of output generated by the sensor and displayed according to embodiments as seen in FIG. 7.

An example of a revolution worth of raw values of the data signal 32 of the sensor 31 is shown in FIGS. 7 and 8, in which the vertical axes represent the normalized recorded values and the horizontal axes represent number of samples. As seen in FIGS. 7 and 8, the data signal fluctuates in amplitude and in frequency. The amplitude variations are the result of the changing distance between the sensor 31 and the surface of the stator 20. The frequency variations are the result of changes in rotational speed, such as can occur when the large, heavy rotor 10 is manually rotated. The minima of the curve represent the points of closest approach of the surface of the stator 20, which are the distances to the stator teeth 22.

As mentioned above, an embodiment of the invention includes computer-implemented processes or methods and apparatus for practicing such processes, such as the computer processor 33. Additionally, as also mentioned above, an embodiment includes a computer software application or program product that includes computer code, such as object code, source code, or executable code, on a storage device 35 that includes tangible, computer readable media, such as magnetic media (floppy diskettes, hard disc drives, tape, etc.), optical media (compact discs, digital versatile/video discs, magneto-optical discs, etc.), random access memory (RAM), read only memory (ROM), flash ROM, erasable programmable read only memory (EPROM), or any other computer readable storage medium on which the computer program code is stored and with which the computer program code can be loaded into and executed by a computer. When the computer executes the computer program code, it becomes an apparatus for practicing the invention, and on a general purpose microprocessor, specific logic circuits are created by configuration of the microprocessor with computer code segments. For example, the method as described above when implemented as computer software and executed on a processor creates respective means for performing the steps of the method. A technical effect of the executable instructions is to provide an indication of the distance between the rotor and the stator surface.

The computer program code is written in computer instructions executable by the computer processor, such as in the form of software encoded in any programming language. Examples of suitable programming languages include, but are not limited to, assembly language, VHDL (Verilog Hardware Description Language), Very High Speed IC Hardware Description Language (VHSIC HDL), FORTRAN (Formula Translation), C, C++, C#, Java, ALGOL (Algorithmic Language), BASIC (Beginner All-Purpose Symbolic Instruction Code), APL (A Programming Language), ActiveX, HTML (HyperText Markup Language), XML (eXtensible Markup Language), and any combination or derivative of one or more of these.

By using the method according to embodiments, the distance between the rotor and stator in a generator can automatically be determined when the rotor is turned at variable speed, enhancing accuracy and efficiency of the determination of how centered the rotor is relative to the stator.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

The invention claimed is:

1. A method comprising:
sending a data signal to a computer processor, the data signal being indicative of a gap between a sensor and at least one of a surface of a rotor and a surface of a stator that is rotating relative to the sensor;
executing a computer executable code stored on a non-transitory computer readable medium with the processor to implement:
defining, using a buffer that stores a predetermined number of most recent values of the data signal from the sensor, a plurality of lowest values of the data signal over a revolution of relative rotation between the rotor and the stator; and
displaying the plurality of lowest values for assessment of the distance between the sensor and a surface of at least one of the rotor and the stator in order to determine a position of the rotor relative to the stator.

2. The method of claim 1 wherein displaying comprises remapping the plurality of lowest values using positions of stator teeth at which respective lowest values occur and plotting the plurality of lowest values versus position at which respective lowest values were obtained to provide a curve of lowest value versus position.

3. The method of claim 1 wherein the data signal is a voltage that varies with the distance between the sensor and the stator.

4. The method of claim 1 wherein defining a plurality of lowest values of the data signal includes providing a buffer that stores a predetermined number of most recent values of the data signal of the sensor, comparing a center value of the predetermined number of most recent values to adjacent values in the buffer, determining whether the center value is lower than the adjacent values, and determining that the center value is a lowest value if it is lower than the adjacent values.

5. The method of claim 4 wherein providing a buffer comprises selecting a predetermined number that is large enough to reduce sensitivity to noise but is small enough to encompass only one of a plurality of evenly distributed stator teeth.

6. The method of claim 4 wherein the predetermined number is at least 3.

7. The method of claim 4 wherein providing a buffer comprises providing a First In First Out buffer.

8. The method of claim 1 wherein defining a plurality of lowest values of the data signal includes:
dividing values of the data signal for a single revolution of data into groups of consecutive data signal values; and
defining a lowest value of the data signal for each group of values.

9. The method of claim 1 further comprising providing a data storage medium, recording values of the data signal to the data storage medium, connecting the data storage medium to the computer processor, and the computer software application further implements retrieving recorded values of the data signal.

10. The method of claim 1 wherein defining a plurality of lowest values of the data signal includes calculating a slope for a curve of data signal value versus order obtained, finding transition points of the curve where the slope switches from negative to positive, and determining that the data signal value at each transition point is a respective lowest value of the data signal.

11. The method of claim 10 wherein defining a plurality of lowest values of the data signal further includes dividing the curve into sections of consecutive data signal values, each section including at least two values of the data signal, and calculating a slope includes calculating a slope of each section of the curve.

12. The method of claim 1 wherein defining a plurality of lowest values of the data signal includes setting a threshold value at a predetermined percentage of the data signal and determining a minimum value of the data signal between each crossing of the threshold by the value of the data signal.

13. An apparatus comprising:
a computer processor configured to receive a sensor data signal indicative of a gap between a sensor and at least one of a surface of a rotor and a surface of a stator that is rotating relative to the sensor and to execute a computer executable code to form:
means for defining a plurality of lowest values of the data signal over a revolution of relative rotation between the rotor and the stator; and
means for displaying the plurality of lowest values for assessment of the distance between the sensor and a surface of at least one of the rotor and the stator in order to determine a position of the rotor relative to the stator.

14. The apparatus of claim 13 wherein the sensor data signal is generated by a capacitive sensor.

15. The apparatus of claim 13 wherein the data signal is a voltage.

16. The apparatus of claim 13 wherein the means for defining a plurality of lowest values of the data signal includes a buffer that stores a predetermined number of most recent values of the data signal of the sensor, means for comparing a center value of the predetermined number of most recent values to adjacent values in the buffer, means for determining whether the center value is lower than the adjacent values, and means for determining that the center value is a lowest value if it is lower than the adjacent values.

17. The apparatus of claim 16 wherein the predetermined number of most recent values is large enough to reduce sensitivity to noise but is small enough to encompass only one of a plurality of evenly distributed stator teeth.

18. The apparatus of claim 16 wherein the buffer comprises a First In First Out buffer.

19. The apparatus of claim 13 further comprising a data storage device on which the data signal of the sensor is recorded, the computer processor further forming:
means for dividing the recorded data signal of a single revolution of data into sections of consecutive data signal values at consecutive based on an order in which the values were obtained;
finding a minimum recorded value of the data signal for each section; and
identifying each minimum recorded value as a respective lowest value for each respective section.

20. A computer program product comprising a non-transitory computer readable medium having computer executable code stored thereon such that when executed the code directs the processor to perform a method comprising:
receiving a data signal indicative of a gap between a sensor and at least one of a surface of a rotor and a surface of a stator that is rotating relative to the sensor;
defining a plurality of lowest values of the data signal over a revolution of relative rotation between the rotor and the stator by:
providing a buffer that stores a predetermined number of most recent values of the data signal of the sensor;
comparing a center value of the predetermined number of most recent values to adjacent values in the buffer; and
determining whether the center value is lower than the adjacent values, and determining that the center value is a lowest value if it is lower than the adjacent values;
remapping the plurality of lowest values to predefined positions on the at least one of a surface of a rotor and a surface of a stator; and
displaying the plurality of lowest values for assessment of the distance between the sensor and a surface of at least one of the rotor and the stator in order to determine a position of the rotor relative to the stator.

* * * * *